Feb. 28, 1961  B. GYURKO, JR  2,972,883
ADJUSTABLE PNEUMATIC GAGE
Filed Oct. 31, 1957
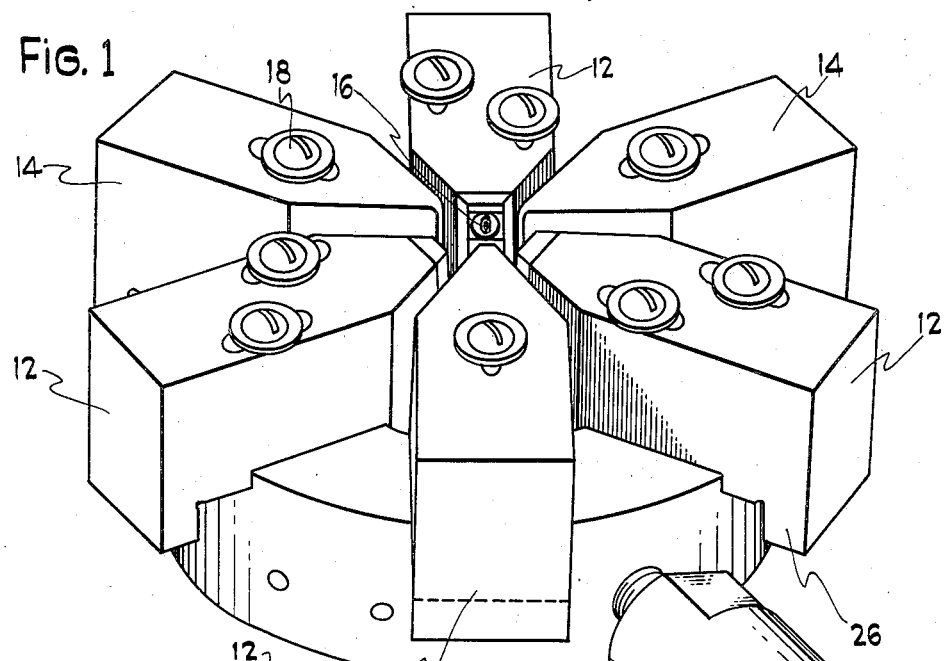
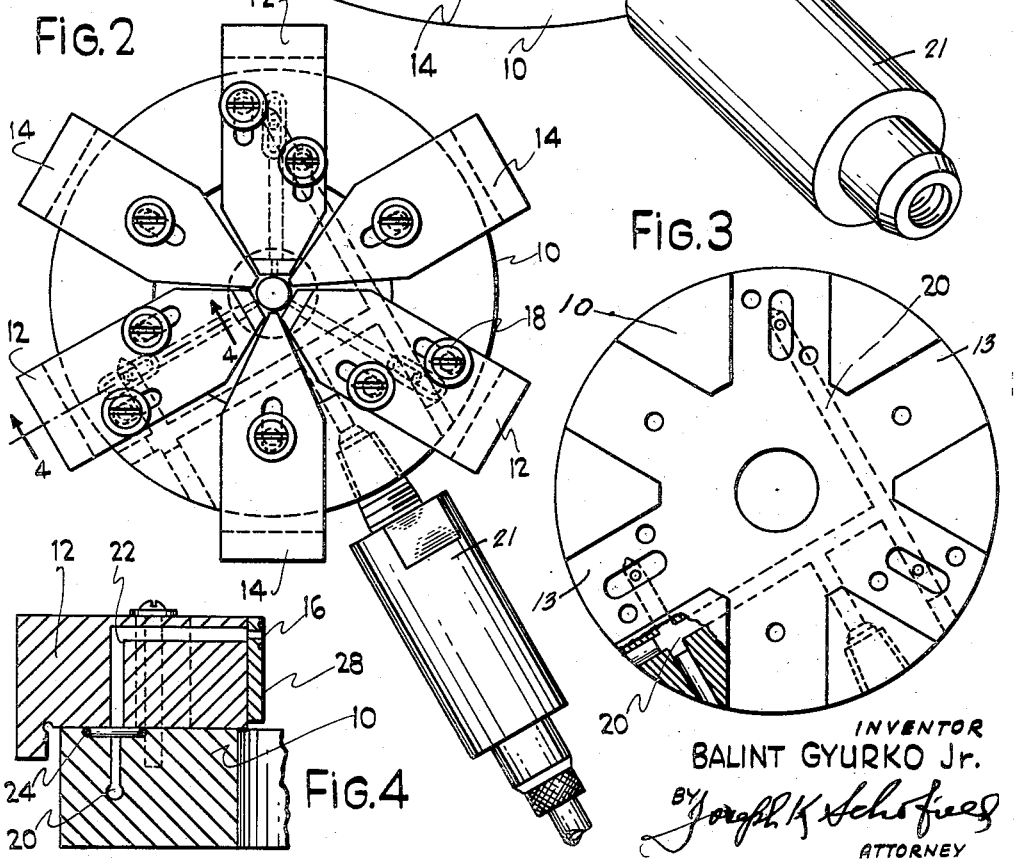
INVENTOR
BALINT GYURKO Jr.
BY Joseph K. Schofield
ATTORNEY United States Patent Office 2,972,883
Patented Feb. 28, 1961

2,972,883
ADJUSTABLE PNEUMATIC GAGE

Balint Gyurko, Jr., Torrington, Conn., assignor to Pratt & Whitney Company Incorporated, West Hartford, Conn., a corporation of Delaware Filed Oct. 31, 1957, Ser. No. 693,669

2 Claims. (Cl. 73—37.8)

This invention relates to dimension gages of the pneumatic type and in particular to an adjustable gage of that type for determining diameters of cylindrical objects.

A primary object of the invention is to provide a precision pneumatic gage with its nozzle carrying gaging members adjustable to different radial positions for gaging outside cylindrical surfaces of widely different diameters.

Another object of importance of the invention is that positioning devices are provided to centrally locate the cylindrical member being gaged relative to the nozzles of the gaging members.

Another object of importance of the invention is to accurately locate the gaging members with their gaging orifices properly and uniformly spaced from the cylindrical surface being gaged.

One feature that enables the above objects to be accomplished is that the air nozzles are mounted at the inner ends of radially adjustable members supplied with air to their nozzles in the end faces of their inner tapered ends, the outer ends of these gaging members and the centering members being formed with depending flanges spaced from the outer cylindrical surface of the base member to permit measuring blocks to be inserted between the inner surfaces of the flanges and the peripheral surface of the base to position the inner faces of the radially adjustable gaging members and positioning members for gaging cylinders of different diameters.

With the above and other objects in view the invention may include the features of construction and operation set forth in the following specification and illustrated in the accompanying drawing.

In the accompanying drawing annexed hereto and forming a part of this specification I have shown the invention embodied in a gage for outside cylindrical surfaces of widely different diameters. It will, however, be understood that the invention can be otherwise embodied and that the drawing is not to be construed as defining or limiting the scope of the invention, the claims appended to this specification being relied upon for that purpose.

In the drawing:

Figure 1 is a perspective view of a complete pneumatic gage embodying the present invention.

Fig. 2 is a plan view of the gage shown in Fig. 1.

Fig. 3 is a plan view of the base member, the radially adjustable members having been removed, and Fig. 4 is a vertical section through the base and one of the radially adjustable nozzle members, the section being taken on the plane of line 4—4 of Fig. 2.

In the above mentioned drawing there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a base member having a cylindrical peripheral surface and a radially grooved upper surface; second, air supplying conduits within the base member leading to openings in alternate radial grooves; third, gaging members having nozzle orifices in their inner end faces adjustable radially along the grooves provided in the upper surface of the base; fourth, radially adjustable positioning or centering members secured within appropriate alternate grooves in the upper surface of the body member; and fifth, depending integral flanges at the outer ends of the gaging and centering members, the inner surfaces of these flanges being equally spaced at predetermined different distances from the cylindrical outer surface of the base depending on the diameter being gaged.

Referring more in detail to the figures of the drawing, and first to Fig. 1, it will be seen that there has been provided a base member 10 the outer surface of which is cylindrical and on which slidable members 12 and 14 are mounted for radial movement in the upper surfaces of grooves 13. Members 12 are gaging members having air supplying nozzles 16 in their inner end faces. These members 12 may be secured in predetermined radially adjusted positions by suitable clamping screws 18. Preferably and as shown in Fig. 1, there are three of these gaging members 12 disposed 120° apart and having their inner ends suitably tapered as shown to permit their inner end faces to be brought closely together.

Also mounted on the upper surface of the base member 10 and radially movable within suitable grooves 13 provided therefor are the centering or positioning members 14 for the member being gaged. Preferably there are three of these members 14 disposed alternately between the gaging members 12. These centering or positioning members also have their inner ends tapered as shown for adjustment to positions close together and are adjusted to positions permitting entrance of the member being gaged between their inner tapered ends. These members 14 also may be clamped in predetermined positions by screws 18.

Within the base or body member 10 are air supplying conduits 20. These conduits extend from a suitable air inlet connection 21 to the surfaces of the radial grooves 13 for the gaging members 12, which are in a common plane. By means of these conduits 20 as shown in outline in Fig. 3, air is supplied at a common constant pressure to the central portion of the grooves 13 within which the gaging members 12 are mounted. The openings of these conduits 20 in the lower surfaces of the grooves 13 are elongated radially as shown so that in any radial position of the gaging members 12 air may be supplied from the conduits 20 to conduits 22 provided within the gaging members. To form a pressure tight seal between the conduits 20 in the base 10 and in the gaging members 12, O rings 24 of rubber may be inserted as shown.

Each of the air conduits 22 in the gaging members 12 at one end intersects one of the elongated recesses 20 in the groove 13 within which the gaging member 12 slides and the opposite end terminates in an orifice in a wear resisting facing member 28 or end surface at the inner truncated tapered end of this member.

In order to secure the gaging members 12 to the base member 10 the screws 18 therefor extend through elongated openings in the gaging members 12 permitting securing these members 12 to the base member 10 in any radially adjusted position. Also similar clamping means are provided for the positioning members, elongated radial slots being provided for that purpose in the members 14 for the clamping screws 18 extending therethrough.

In order to position the gaging members 12 for different diameters to be gaged, integral flanges 26 depending from the outer ends of the gaging members are provided, the inner surface of each of which is normal to its direction of movement and at a predetermined distance from the inner end of its gaging member 12. Each of the gaging members 12 is identical in so far as this dimension is concerned. By the introduction of suitable gage blocks (not shown) between the inner plane surface of the depending flange 26 and the cylindrical outer surface of the base 10 the members may be adjusted to be suitably and centrally spaced relative to the base member 10. Also their nozzle carrying inner ends will be equally spaced from the member being gaged. The positioning members 14 also may be provided with depending flanges 26 so that they also may be suitably centered relative to the base member 10 and in position to slidably engage the surface of the member being gaged. To facilitate this disposition of the gaging members 12 and centering members 14 the distance from the inner flange surface of the positioning members 14 may exceed slightly the corresponding distance of the gaging members 12. The clearance, therefore, between the inner surfaces of the gaging members 12 and the surface being gaged may be predetermined. By varying this clearance the magnification of the gage may be controlled.

I claim as my invention:

1. A pneumatic gage comprising a base having a cylindrical periphery, said base also having radially disposed grooves formed in the upper surface thereof, elongated radially adjustable gaging members mounted in said grooves and having air supplying conduits therein extending to orifices at their adjacent inner end faces, and depending flanges at the outer ends of said gaging members having their inner surfaces each normal to the direction of movement of its gaging member, the distance between the inner surface of a flange and the orifice at the inner end of each of said gaging members being equal, whereby the spacing of said flanges from the peripheral surface of said base will indicate the central and radial adjustment of said gaging members.

2. A pneumatic gage comprising a base having a cylindrical periphery, said base also having radially disposed grooves formed in the upper surface thereof, elongated radially adjustable gaging members mounted in said grooves and having air supplying conduits therein extending to orifices at their adjacent inner end faces, elongated radially adjustable centering members slidably engaging the part being gaged at the inner ends of said centering members, and depending flanges on said gaging and centering members having their inner surfaces normal to the direction of movement of their respective gaging or centering members, whereby the spacing of said flanges from the peripheral surface of said base will indicate the central and radial adjustment of said gaging and centering members.

References Cited in the file of this patent
UNITED STATES PATENTS

| 2,421,484 | Diamond | June 3, 1947 |
| 2,687,038 | Aller | Aug. 24, 1954 |
| 2,718,140 | Aller | Sept. 20, 1955 |

OTHER REFERENCES

Publication: Johansson Gage Blocks and Accessories, Catalog No. 17, Ford Motor Co., Dearborn, Mich., June 1, 1945, 33–168A. (Copy in Div. 66.)